United States Patent
Bell (10) Patent No.: US 11,780,405 B1
(45) Date of Patent: Oct. 10, 2023

(54) VEHICLE ALARM ASSEMBLY

(71) Applicant: Vincent Bell, San Francisco, CA (US)

(72) Inventor: Vincent Bell, San Francisco, CA (US)

( * ) Notice: Subject to any disclaimer, the term of this patent is extended or adjusted under 35 U.S.C. 154(b) by 0 days.

(21) Appl. No.: 17/748,845

(22) Filed: May 19, 2022

(51) Int. Cl.
*B60R 25/10* (2013.01)

(52) U.S. Cl.
CPC .. *B60R 25/1004* (2013.01); *B60R 2025/1013* (2013.01); *B60R 2325/20* (2013.01)

(58) Field of Classification Search
CPC ........ B60R 25/1004; B60R 2025/1013; B60R 2325/20
See application file for complete search history.

(56) References Cited

U.S. PATENT DOCUMENTS

| | | | | |
|---|---|---|---|---|
| 3,367,616 A * | 2/1968 | Bausch | ...................... | B60R 1/04 403/56 |
| 4,382,572 A * | 5/1983 | Thompson | ................ | B60R 1/04 403/56 |
| 4,456,383 A * | 6/1984 | Speckhart | .............. | G04C 3/002 368/110 |
| 4,765,674 A * | 8/1988 | Svensson | ............... | B60J 3/0213 384/296 |
| 4,936,533 A * | 6/1990 | Adams | ...................... | B60R 1/04 248/222.13 |
| 5,127,700 A * | 7/1992 | Joe | .......................... | B60R 1/082 296/97.5 |
| 5,385,161 A * | 1/1995 | Loker | .................... | A45B 11/00 248/205.5 |
| 5,453,740 A * | 9/1995 | Gallagher | ............... | G01S 13/56 340/436 |
| 5,984,482 A * | 11/1999 | Rumsey | .................... | B60R 1/04 248/478 |
| 6,318,870 B1 * | 11/2001 | Spooner | ................. | B60R 1/086 359/872 |
| 6,520,463 B1 * | 2/2003 | Ouano | ................. | A47B 96/061 248/223.41 |
| 6,637,952 B2 * | 10/2003 | Arbuckle | ......... | G08B 13/19619 348/143 |
| 6,703,925 B2 | 3/2004 | Steffel | | |
| 6,877,709 B2 * | 4/2005 | March | ..................... | F16C 11/06 248/549 |
| 6,954,138 B1 | 10/2005 | Sugiura | | |
| 7,572,074 B2 * | 8/2009 | Teratani | ............... | G03B 17/561 396/419 |

(Continued)

FOREIGN PATENT DOCUMENTS

WO WO2015136059 9/2015

*Primary Examiner* — Nay Tun (57) ABSTRACT

A vehicle alarm assembly includes a housing that is positionable in a vehicle. A communication unit is integrated into the housing and the communication unit is in remote communication with a personal electronic device and an extrinsic communication network. A plurality of motion sensors is each integrated into the housing to sense motion within a predetermined distance of the vehicle. A plurality of cameras is each integrated into the housing to visually monitor the surrounding area of the vehicle. A microphone is integrated into the housing to capture audio and a speaker is remotely positioned with respect to the housing to emit audible sound outwardly from the housing. Each of the motion sensors, the cameras and the microphone is in communication with the communication unit.

8 Claims, 4 Drawing Sheets

(56) References Cited

U.S. PATENT DOCUMENTS

| | | | |
|---|---|---|---|
| 8,186,893 B1 * | 5/2012 | Patterson | F16M 11/10 396/428 |
| 8,743,203 B2 * | 6/2014 | Karner | B29C 45/14754 348/148 |
| 8,773,316 B2 * | 7/2014 | Van Den Elzen | B60R 11/0258 343/720 |
| 9,352,691 B2 * | 5/2016 | Watson | G02B 7/182 |
| D868,869 S | 12/2019 | Hodge | |
| 10,654,448 B2 | 5/2020 | Etonye | |
| 10,672,307 B2 * | 6/2020 | Kesler | G09F 17/00 |
| 10,744,944 B2 * | 8/2020 | Steffes | B60R 1/086 |
| 10,752,175 B2 * | 8/2020 | Blakeman | B60R 1/04 |
| 10,847,007 B1 * | 11/2020 | Felix | G08B 21/0291 |
| 10,899,317 B1 * | 1/2021 | Moeller | G08B 25/008 |
| 2002/0088916 A1 * | 7/2002 | March | B60R 1/04 248/483 |
| 2003/0090820 A1 * | 5/2003 | Matsuura | B60R 1/04 359/872 |
| 2004/0267419 A1 | 12/2004 | Jeng | |
| 2005/0124178 A1 * | 6/2005 | Tiesler | H01R 13/6275 439/34 |
| 2005/0162513 A1 * | 7/2005 | Chan | G07C 5/085 348/118 |
| 2006/0110155 A1 * | 5/2006 | Kouchi | F16M 11/14 396/419 |
| 2007/0097212 A1 * | 5/2007 | Farneman | H04N 5/77 386/E5.069 |
| 2007/0206945 A1 * | 9/2007 | DeLorme | G03B 41/00 396/332 |
| 2008/0136914 A1 * | 6/2008 | Carlson | G08B 13/19695 348/E7.091 |
| 2009/0289790 A1 * | 11/2009 | Issokson | G08B 25/008 340/552 |
| 2010/0012417 A1 * | 1/2010 | Walter | B60K 28/063 455/556.1 |
| 2011/0080481 A1 * | 4/2011 | Bellingham | H04N 7/183 348/148 |
| 2011/0156893 A1 * | 6/2011 | Hwang | B60R 1/12 340/442 |
| 2013/0038733 A1 * | 2/2013 | Palmer | H04N 5/33 348/148 |
| 2013/0335550 A1 * | 12/2013 | Rochenski | G08B 21/043 348/82 |
| 2016/0105406 A1 * | 4/2016 | Smith | H04W 8/26 713/171 |
| 2017/0066370 A1 * | 3/2017 | Bowe | B60R 13/00 |
| 2018/0345860 A1 * | 12/2018 | Imamura | G02B 27/0025 |
| 2018/0367731 A1 | 12/2018 | Gatti | |
| 2022/0280856 A1 * | 9/2022 | Baker | F16M 13/02 |

* cited by examiner

VEHICLE ALARM ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to alarm devices and more particularly pertains to a new alarm device for discouraging an individual from vandalizing or stealing a vehicle. The device includes a housing that is positioned in a vehicle, a plurality of motion sensors each coupled to the housing and a plurality of cameras each coupled to the housing. The device includes a communication unit that is in communication with a personal electronic device and a remote data storage unit. The device includes a microphone that is integrated into the housing and a speaker that is remotely positioned with respect to the housing. The microphone and the speaker facilitate a user to hear audible sounds from the microphone and to speak through the speaker.

(2) Description of Related Art Including Information Disclosed Under 37 CFR 1.97 and 1.98

The prior art relates to alarm devices including a vehicle monitoring device that includes a housing and a series of mirrors disposed within the housing. The prior art discloses an image processing device for capturing a full face image of a vehicle thief. The prior art discloses a vehicle security device that includes image capturing devices and global positioning for tracking the location of a vehicle. The prior art discloses a method of recording driving data that is integrated into a rearview mirror of a vehicle. The prior art discloses a camera system for vehicles which captures panoramic video and image processing.

BRIEF SUMMARY OF THE INVENTION

An embodiment of the disclosure meets the needs presented above by generally comprising a housing that is positionable in a vehicle. A communication unit is integrated into the housing and the communication unit is in remote communication with a personal electronic device and an extrinsic communication network. A plurality of motion sensors is each integrated into the housing to sense motion within a predetermined distance of the vehicle. A plurality of cameras is each integrated into the housing to visually monitor the surrounding area of the vehicle. A microphone is integrated into the housing to capture audio and a speaker is remotely positioned with respect to the housing to emit audible sound outwardly from the housing. Each of the motion sensors, the cameras and the microphone is in communication with the communication unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
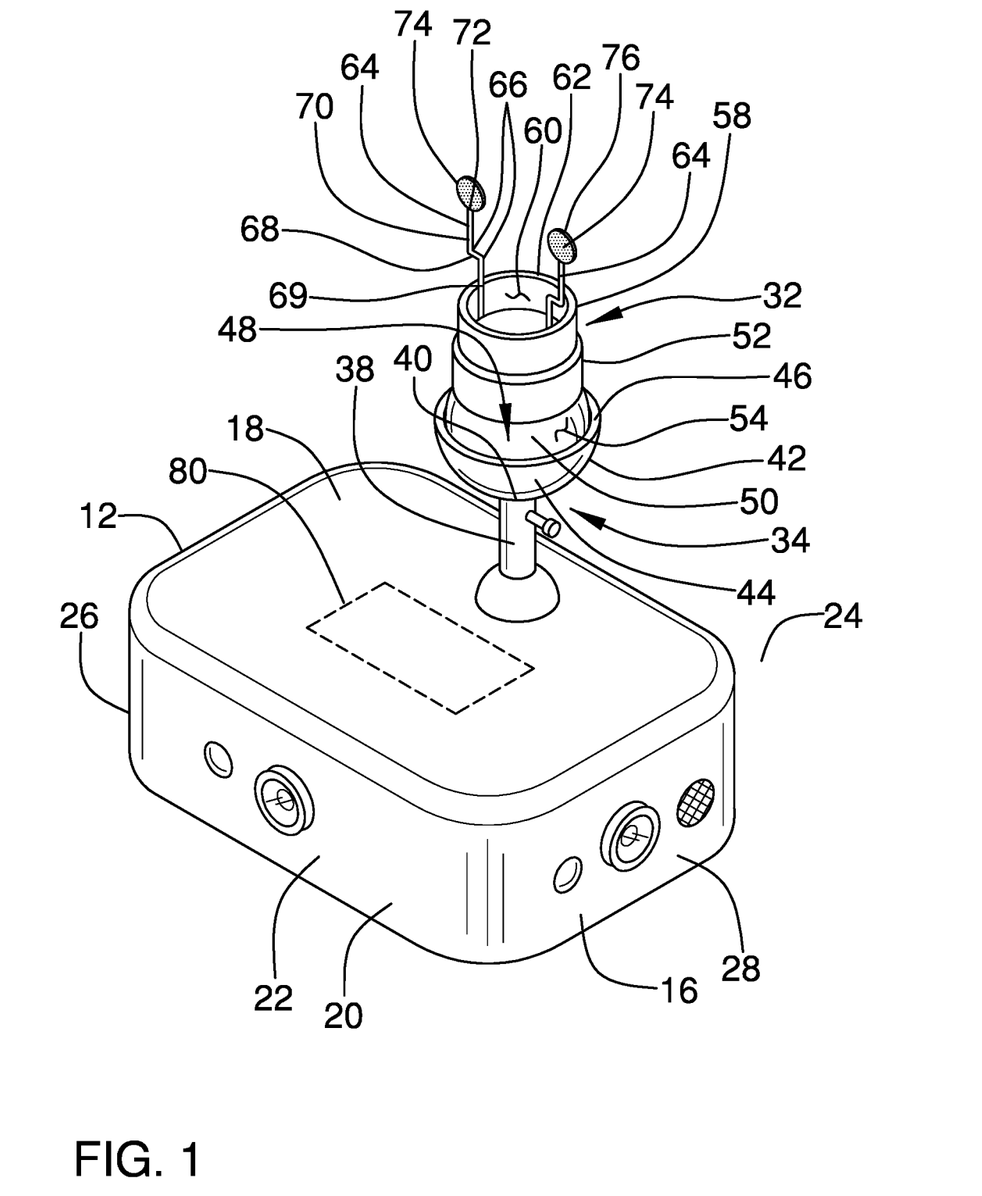
FIG. 1 is a top perspective view of a vehicle alarm assembly according to an embodiment of the disclosure.
Figure 2:
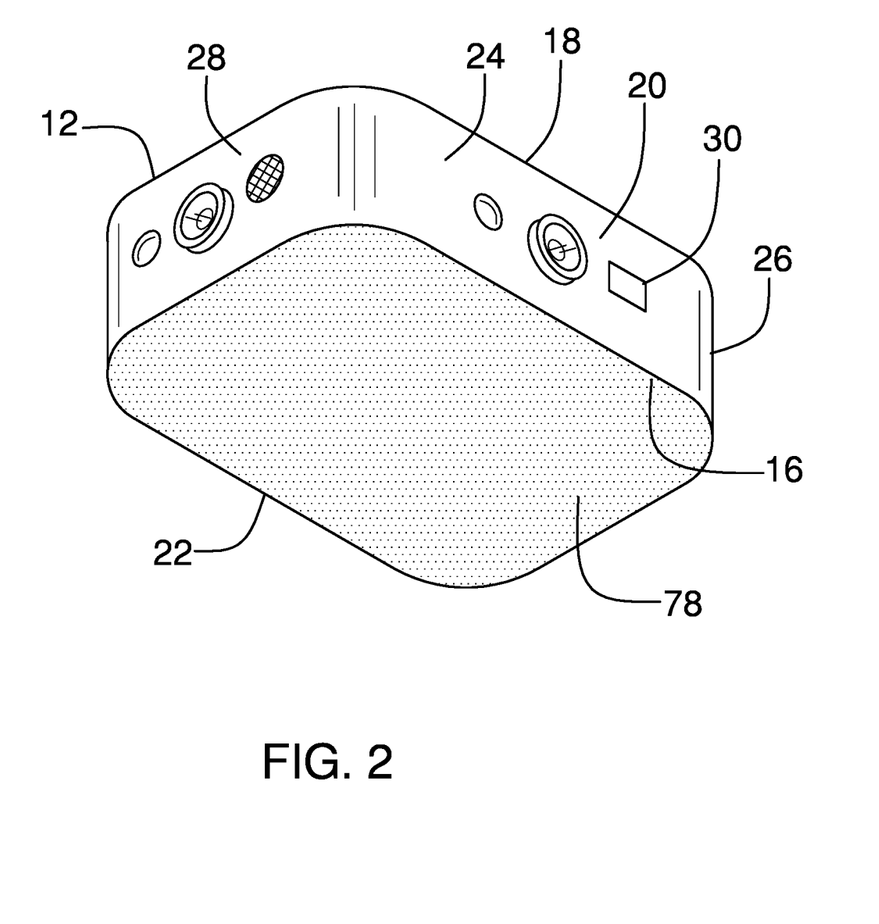
FIG. 2 is a bottom perspective view of an embodiment of the disclosure.
Figure 3:
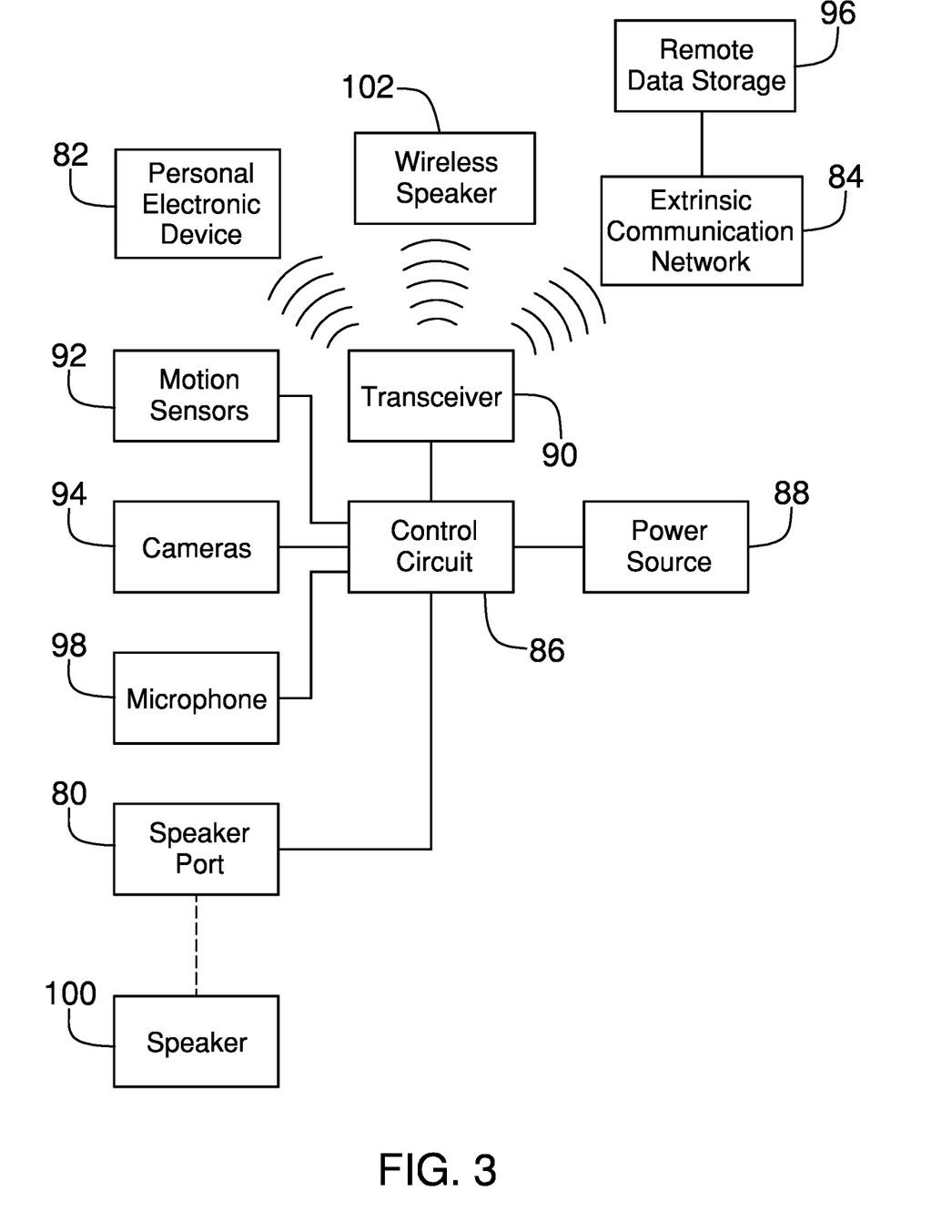
FIG. 3 is a schematic view of an embodiment of the disclosure.
Figure 4:
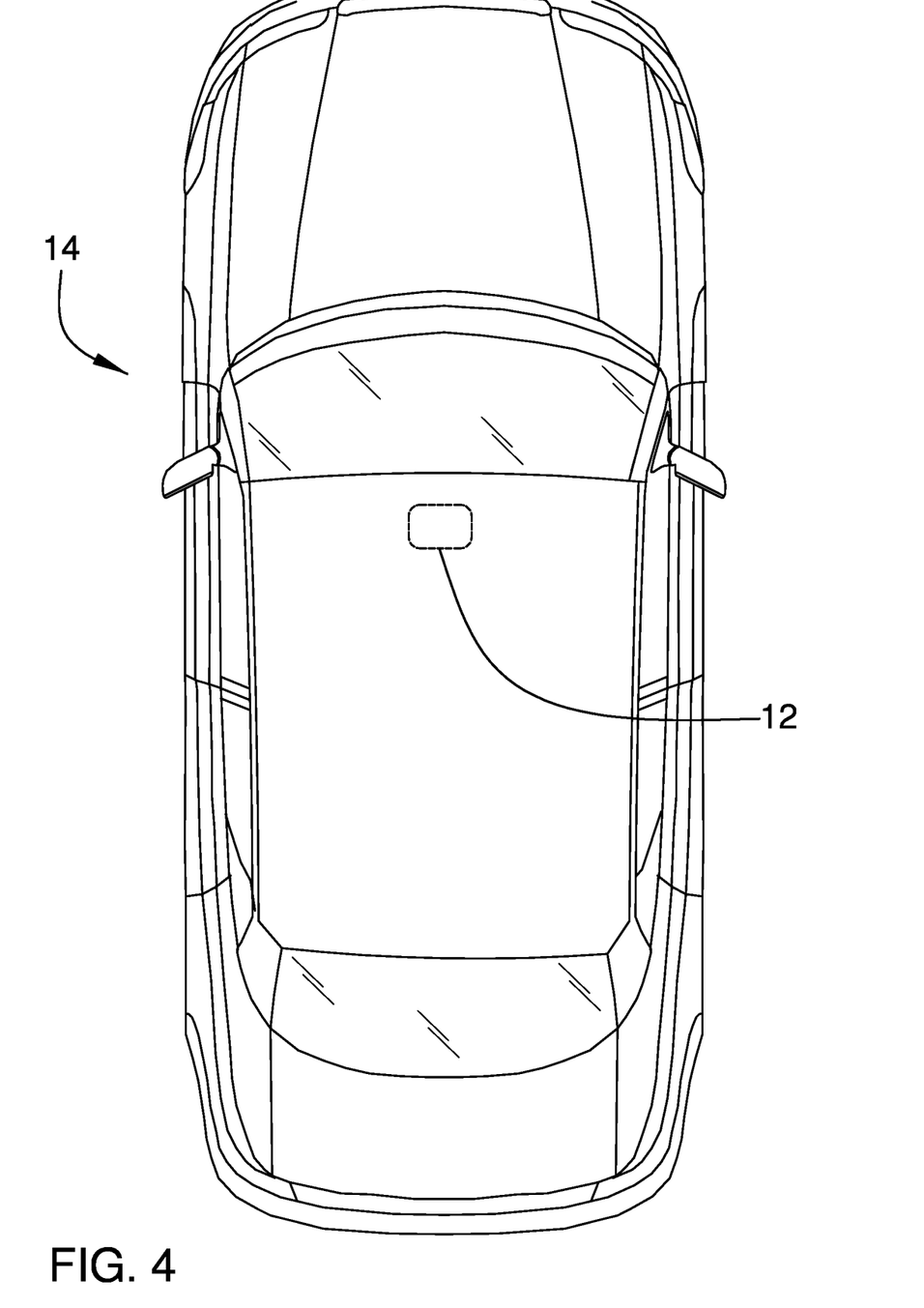
FIG. 4 is a perspective in-use view of an embodiment of the disclosure.

With reference now to the drawings, and in particular to FIGS. 1 through 4 thereof, a new alarm device embodying the principles and concepts of an embodiment of the disclosure and generally designated by the reference numeral 10 will be described.

As best illustrated in FIGS. 1 through 4, the vehicle alarm assembly 10 generally comprises a housing 12 that is positionable in a vehicle 14. The housing 12 has a bottom wall 16, a top wall 18 and an outer wall 20 extending between the top wall 18 and the bottom wall 16. The outer wall 20 has a front side 22, a back side 24, a first lateral side 26 and a second lateral side 28, and a speaker port 30 is integrated into the outer wall 20. The vehicle 14 may be a passenger vehicle, a cargo vehicle or any other type of vehicle that is driven on public roadways.

A coupling unit 32 is coupled to and extends upwardly from the housing 12. The coupling unit 32 includes a first portion 34 that is pivotally coupled to a second portion 36 thereby facilitating the second portion 36 to be positioned at a variety of orientations with the housing 12. The first portion 34 comprises a stem 38 that is coupled to and extends upwardly from the top wall 18 of the housing 12.

The stem 38 is centrally positioned on the top wall 18 and the stem 38 has a distal end 40 with respect to the top wall 18. The first portion 34 includes a cup 42 that has an outer wall 44 and a top edge 46 defining an opening 48 into the cup 42. The outer wall 44 of the cup 42 is coupled to the distal end 40 the stem 38 such that the top edge 46 lies on a plane that is oriented coplanar with the top wall 18 of the housing 12.

The second portion 36 of the coupling unit 32 comprises a ball 50 that is positioned in the cup 42. The ball 50 has a diameter that is greater than a diameter of the opening defined by the top edge 46 of the cup 42 such that the ball 50 is inhibited from being removed from the cup 42. The second portion 36 includes a first ring 52 that is coupled to an outer surface 54 of the ball 50 and the first ring 52 has a distal edge 56 with respect to the outer surface 54. The second portion 36 includes a second ring 58 that is engaged to the first ring 52, and the second ring 58 extends upwardly from the distal edge 56 of the first ring 52. The second ring 58 has a diameter that is less than a diameter of the first ring 52 and the second ring 58 has an inner surface 60 and a top edge 62.

A pair of fingers 64 is provided and each of the fingers 64 has a pair of bends 66 integrated into the fingers 64 to define a central portion 68 that is perpendicularly oriented with a lower portion 69 and an upper portion 70. The lower portion 69 of each of the fingers 64 is coupled to the inner surface 60 of the second ring 58 having the central portion 68 of each of the fingers 64 being spaced upwardly from the top edge 46 of the second ring 58. The fingers 64 are positioned on opposing sides of the second ring 58 with respect to each other and the upper portion 70 of each of the fingers 64 has an upper end 72. A pair of finger mating members 74 is provided and each of the finger mating members 74 has a perimeter edge 76 that is continuously arcuate such that each of the finger mating members 74 has a circular shape. The perimeter edge 76 of each of the finger mating members 74 is coupled to the upper end 72 of the upper portion 70 of a respective one of the fingers 64. Each of the finger mating members 74 may comprise a hook and loop fastener or other type of multiple use, non-mechanical fastener.

A mating member 78 is attached to the housing 12 such that the mating member 78 releasably engages the vehicle 14 for attaching the housing 12 to the vehicle 14. The mating member 78 is positioned on the bottom wall 16 of the housing 12 and the mating member 78 may comprise an adhesive pad or the like. A communication unit 80 is integrated into the housing 12 and the communication unit 80 is in remote communication with a personal electronic device 82. Additionally, the communication unit 80 is in remote communication with an extrinsic communication network 84. The personal electronic device 82 may comprise a smart phone or other similar device with wireless communication capabilities. The extrinsic communication network 84 may comprise the internet, a cellular phone network or other type of wireless communication network.

The communication unit 80 comprises a control circuit 86 that is integrated into the housing 12. The control circuit 86 receives a motion input and the speaker port 30 is electrically coupled to the control circuit 86. The control circuit 86 is electrically coupled to a power source 88 comprising an electrical system of the vehicle 14. The communication unit 80 includes a transceiver 90 that is integrated into the housing 12 and the transceiver 90 is electrically coupled to the control circuit 86. The transceiver 90 is in wireless communication with the personal electronic device 82 and the transceiver 90 is in wireless communication with the extrinsic communication network 84. The transceiver 90 may comprise a radio frequency transceiver or the like and the transceiver 90 may employ a WPAN signal. Additionally, the transceiver 90 may communicate with the personal electronic device 82 via the extrinsic communication network 84 such that communication between the transceiver 90 and the personal electronic device 82 is not limited by distance.

A plurality of motion sensors 92 is provided and each of the motion sensors 92 is integrated into the housing 12 to sense motion within a predetermined distance of the vehicle 14. Each of the motion sensors 92 is integrated into a respective one of the front side 22, the back side 24, the first lateral side 26 or the second lateral side 28 of the outer wall 20. In this way the plurality of motion sensors 92 can sense motion in 360.0 degrees of the vehicle 14. Each of the motion sensors 92 is electrically coupled to the control circuit 86 and the control circuit 86 receives the motion input when any of the motion sensors 92 senses motion. Each of the motion sensors 92 may comprise an electronic motions sensor, including but not being limited to an infra-red motion sensor, and each of the motion sensors 92 may have an operational range of less than 10.0 feet.

A plurality of cameras 94 is each integrated into the housing 12 to visually monitor the surrounding area of the vehicle 14. Each of the cameras 94 is integrated into a respective one of the front side 22, the back side 24, the first lateral side 26 or the second lateral side 28 of the outer wall 20. In this way the plurality of motion sensors 92 can monitor a 360.0 degree area around the vehicle 14. Each of the cameras 94 is electrically coupled to the control circuit 86 and each of the cameras 94 is turned on when the control circuit 86 receives the motion input. The transceiver 90 broadcasts a video signal comprising video footage captured by the cameras 94 to a remote data storage unit 96 via the extrinsic communication network 84 when the control circuit 86 receives the motion input. Each of the cameras 94 may comprise a digital video camera or the like and the remote data storage unit 96 may comprise a personal computer or other type of digital data storage device thereby facilitating the video footage to be analyzed by law enforcement in the event that the vehicle 14 is vandalized or stolen.

A microphone 98 is integrated into the housing 12 to capture audible sounds and the microphone 98 is integrated into the outer wall 20 of the housing 12. The microphone 98 is actuated when the control circuit 86 receives the motion input. Furthermore, the transceiver 90 places the microphone 98 in remote communication with the personal electronic device 82 when the control circuit 86 receives the motion input. In this way the microphone 98 facilitates a user, via the personal electronic device 82, to hear the audio captured by the microphone 98.

A speaker 100 is remotely positioned with respect to the housing 12 to emit audible sound outwardly from the housing 12. The speaker 100 is placed in electrical communication with the speaker port 30 in the outer wall 20 of the housing 12 thereby placing the speaker 100 in electrical communication with the control circuit 86. The speaker 100 is actuated when the control circuit 86 receives the motion input. Furthermore, the transceiver 90 places the speaker 100 in remote communication with the personal electronic device 82 when the control circuit 86 receives the motion input. In this way the speaker 100 facilitates the user to speak through the speaker 100. The speaker 100 may comprise a bullhorn or other similar type of speaker 100 that can be remotely positioned with respect to the housing 12 and the vehicle 14. The speaker port 30 may comprise a universal serial bus port or other type of electronic data port that is compatible with the speaker 100. Alternatively, or in combination with the speaker 100, a wireless speaker 102 may be connected to the control circuit 86 through the transceiver 90.

In use, each of the cameras 94, the microphone 98 and the speaker 100 are actuated when any of the motion sensors 92 senses motion. In this way the cameras 94 begin recording video footage and the personal electronic device 82 receives notification that the motion sensors 92 have sensed motion. In this way the user can speak through the speaker 100 and the microphone 98 can deliver audible sounds captured by the microphone 98. Thus, the user can issue a verbal warning to a potential vandal or thief that might attempt to damage or steal the vehicle 14. Additionally, the video footage is stored in the remote data storage unit 96 to facilitate law enforcement to analyze the footage in the event that the vehicle 14 is vandalized or stolen.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle alarm assembly for monitoring the immediate environment of a vehicle, said assembly comprising:
   a housing being positioned in a vehicle;
   a coupling unit being coupled to and extending upwardly from said housing, said coupling unit including a first portion being pivotally coupled to a second portion thereby facilitating said second portion to be positioned at a variety of orientations with said housing;
   a mating member being attached to said housing such that said mating member releasably engages the vehicle for attaching said housing to the vehicle;
   a communication unit being integrated into said housing, said communication unit being in remote communication with a personal electronic device, said communication unit being in remote communication with an extrinsic communication network;
   a plurality of motion sensors, each of said motion sensors being integrated into said housing wherein each of said motion sensors is configured to sense motion within a predetermined distance of the vehicle, each of said motions sensors being in communication with said communication unit;
   a plurality of cameras, each of said cameras being integrated into said housing wherein each of said cameras is configured to visually monitor the surrounding area of the vehicle, each of said cameras being in communication with said communication unit;
   a microphone being integrated into said housing wherein said microphone is configured to capture audio, said microphone being in communication with said communication unit;
   a speaker being remotely positioned with respect to said housing wherein said speaker is configured to emit audible sound outwardly from said housing;
   wherein said housing has a bottom wall, a top wall and an outer wall extending between said top wall and said bottom wall, said outer wall having a front side, a back side, a first lateral side and a second lateral side, said housing having a speaker port being integrated into said outer wall;
   wherein said mating member being positioned on said bottom wall of said housing;
   wherein each of said motions sensors being integrated into a respective one of said front side, said back side, said first lateral side or said second lateral side of said outer wall wherein said plurality of motions sensors is configured to sense motion in 360.0 degrees of the vehicle;
   wherein each of said cameras being integrated into a respective one of said front side, said back side, said first lateral side or said second lateral side of said outer wall wherein said plurality of motion sensors is configured to monitor a 360.0 degree area around the vehicle;
   wherein said first portion of said coupling unit comprises:
      a stem being coupled to and extending upwardly from said top wall of said housing, said stem being centrally positioned on said top wall, said stem having a distal end with respect to said top wall; and
      a cup having an outer wall and a top edge defining an opening into said cup, said outer wall being coupled to said distal end said stem such that said top edge lies on a plane being oriented coplanar with said top wall of said housing; and
   wherein said second portion of said coupling unit comprises:
      a ball being positioned in said cup, said ball having a diameter being greater than a diameter of said opening defined by said distal edge of said cup such that said ball is inhibited from being removed from said cup;
      a first ring being coupled to an outer surface of said ball, said first ring having a distal edge with respect to said outer surface; and
      a second ring being engaged to said first ring, said second ring extending upwardly from said distal edge of said first ring, said second ring having a diameter being less than a diameter of said first ring, said second ring having an inner surface and a top edge.

2. The assembly according to claim 1, further comprising a pair of fingers, each of said fingers having a pair of bends integrated into said fingers to define a central portion being perpendicularly oriented with a lower portion and an upper portion, said lower portion of each of said fingers being coupled to said inner surface of said second ring having said central portion of each of said fingers being spaced upwardly from said top edge of said second ring, said fingers being positioned on opposing sides of said second ring with respect to each other, said upper portion of each of said fingers having an upper end.

3. The assembly according to claim 2, further comprising a pair of finger mating members, each of said finger mating members having a perimeter edge being continuously arcuate such that each of said finger mating members has a circular shape, said perimeter edge of each of said finger mating members being coupled to said upper end of said upper portion of a respective one of said fingers.

4. The assembly according to claim 1, wherein said communication unit comprises:
   a control circuit being integrated into said housing, said control circuit receiving a motion input, said control circuit being electrically coupled to a power source comprising an electrical system of the vehicle;
   a speaker port being electrically coupled to said control circuit;
   a transceiver being integrated into said housing, said transceiver being electrically coupled to said control circuit, said transceiver being in wireless communication with the personal electronic device, said transceiver being in wireless communication with the extrinsic communication network;
   each of said motion sensors is electrically coupled to said control circuit, said control circuit receiving said motion input when any of said motion sensors senses motion;
   each of said cameras is electrically coupled to said control circuit, each of said cameras being turned on when said control circuit receives said motion input, said transceiver broadcasting a video signal comprising footage captured by said cameras to a remote data storage unit via the extrinsic communication network when said control circuit receives said motion input.

5. The assembly according to claim 4, wherein said microphone is electrically coupled to said control circuit, said microphone is actuated when said control circuit receives said motion input, said transceiver placing said microphone in remote communication with the personal electronic device when said control circuit receives said motion input wherein microphone is configured to facilitate a user to hear audio captured by said microphone on the personal electronic device.

6. The assembly according to claim 4, wherein:
   said assembly includes a speaker port being integrated into said outer wall of said housing, said speaker port being electrically coupled to said control circuit; and
   said speaker is placed in electrical communication with a speaker port in said outer wall of said housing thereby placing said speaker in electrical communication with said control circuit, said speaker being actuated when said control circuit receives said motion input, said transceiver placing said speaker in remote communication with the personal electronic device when said control circuit receives said motion input wherein said speaker is configured to facilitate the user to speak through said speaker.

7. A vehicle alarm assembly for monitoring the immediate environment of a vehicle, said assembly comprising:
   a housing being positioned in a vehicle, said housing having a bottom wall, a top wall and an outer wall extending between said top wall and said bottom wall, said outer wall having a front side, a back side, a first lateral side and a second lateral side, said housing having a speaker port being integrated into said outer wall;
   a coupling unit being coupled to and extending upwardly from said housing, said coupling unit including a first portion being pivotally coupled to a second portion thereby facilitating said second portion to be positioned at a variety of orientations with said housing, said first portion comprising:
      a stem being coupled to and extending upwardly from said top wall of said housing, said stem being centrally positioned on said top wall, said stem having a distal end with respect to said top wall; and
      a cup having an outer wall and a top edge defining an opening into said cup, said outer wall being coupled to said distal end said stem such that said top edge lies on a plane being oriented coplanar with said top wall of said housing;
   said second portion of said coupling unit comprising:
      a ball being positioned in said cup, said ball having a diameter being greater than a diameter of said opening defined by said distal edge of said cup such that said ball is inhibited from being removed from said cup;
      a first ring being coupled to an outer surface of said ball, said first ring having a distal edge with respect to said outer surface; and
      a second ring being engaged to said first ring, said second ring extending upwardly from said distal edge of said first ring, said second ring having a diameter being less than a diameter of said first ring, said second ring having an inner surface and a top edge;
   a pair of fingers, each of said fingers having a pair of bends integrated into said fingers to define a central portion being perpendicularly oriented with a lower portion and an upper portion, said lower portion of each of said fingers being coupled to said inner surface of said second ring having said central portion of each of said fingers being spaced upwardly from said top edge of said second ring, said fingers being positioned on opposing sides of said second ring with respect to each other, said upper portion of each of said fingers having an upper end; and
   a pair of finger mating members, each of said finger mating members having a perimeter edge being continuously arcuate such that each of said finger mating members has a circular shape, said perimeter edge of each of said finger mating members being coupled to said upper end of said upper portion of a respective one of said fingers;
   a mating member being attached to said housing such that said mating member releasably engages the vehicle for attaching said housing to the vehicle, said mating member being positioned on said bottom wall of said housing;
   a communication unit being integrated into said housing, said communication unit being in remote communication with a personal electronic device, said communication unit being in remote communication with an extrinsic communication network, said communication unit comprising:
      a control circuit being integrated into said housing, said control circuit receiving a motion input, said speaker port being electrically coupled to said control circuit, said control circuit being electrically coupled to a power source comprising an electrical system of the vehicle;
      a transceiver being integrated into said housing, said transceiver being electrically coupled to said control circuit, said transceiver being in wireless communication with the personal electronic device, said transceiver being in wireless communication with the extrinsic communication network;
a plurality of motion sensors, each of said motion sensors being integrated into said housing wherein each of said motion sensors is configured to sense motion within a predetermined distance of the vehicle, each of said motions sensors being integrated into a respective one of said front side, said back side, said first lateral side or said second lateral side of said outer wall wherein said plurality of motions sensors is configured to sense motion in 360.0 degrees of the vehicle, each of said motion sensors being electrically coupled to said control circuit, said control circuit receiving said motion input when any of said motion sensors senses motion;
a plurality of cameras, each of said cameras being integrated into said housing wherein each of said cameras is configured to visually monitor the surrounding area of the vehicle, each of said cameras being integrated into a respective one of said front side, said back side, said first lateral side or said second lateral side of said outer wall wherein said plurality of motion sensors is configured to monitor a 360.0 degree area around the vehicle, each of said cameras being electrically coupled to said control circuit, each of said cameras being turned on when said control circuit receives said motion input, said transceiver broadcasting a video signal comprising footage captured by said cameras to a remote data storage unit via the extrinsic communication network when said control circuit receives said motion input;
a microphone being integrated into said housing wherein said microphone is configured to capture audio, said microphone being integrated into said outer wall of said housing, said microphone being actuated when said control circuit receives said motion input, said transceiver placing said microphone in remote communication with the personal electronic device when said control circuit receives said motion input wherein microphone is configured to facilitate a user to hear audio captured by said microphone via the personal electronic device; and
a speaker being remotely positioned with respect to said housing wherein said speaker is configured to emit audible sound outwardly from said housing, said speaker being placed in electrical communication with said speaker port in said outer wall of said housing thereby placing said speaker in electrical communication with said control circuit, said speaker being actuated when said control circuit receives said motion input, said transceiver placing said speaker in remote communication with the personal electronic device when said control circuit receives said motion input wherein said speaker is configured to facilitate the user to speak through said speaker.

8. A vehicle alarm system for monitoring the immediate environment of a vehicle, said system comprising:
a vehicle;
a personal electronic device;
a housing being positioned in said vehicle, said housing having a bottom wall, a top wall and an outer wall extending between said top wall and said bottom wall, said outer wall having a front side, a back side, a first lateral side and a second lateral side, said housing having a speaker port being integrated into said outer wall;
a coupling unit being coupled to and extending upwardly from said housing, said coupling unit including a first portion being pivotally coupled to a second portion thereby facilitating said second portion to be positioned at a variety of orientations with said housing, said first portion comprising:
a stem being coupled to and extending upwardly from said top wall of said housing, said stem being centrally positioned on said top wall, said stem having a distal end with respect to said top wall; and
a cup having an outer wall and a top edge defining an opening into said cup, said outer wall being coupled to said distal end said stem such that said top edge lies on a plane being oriented coplanar with said top wall of said housing:
said second portion of said coupling unit comprising:
a ball being positioned in said cup, said ball having a diameter being greater than a diameter of said opening defined by said distal edge of said cup such that said ball is inhibited from being removed from said cup;
a first ring being coupled to an outer surface of said ball, said first ring having a distal edge with respect to said outer surface; and
a second ring being engaged to said first ring, said second ring extending upwardly from said distal edge of said first ring, said second ring having a diameter being less than a diameter of said first ring, said second ring having an inner surface and a top edge;
a pair of fingers, each of said fingers having a pair of bends integrated into said fingers to define a central portion being perpendicularly oriented with a lower portion and an upper portion, said lower portion of each of said fingers being coupled to said inner surface of said second ring having said central portion of each of said fingers being spaced upwardly from said top edge of said second ring, said fingers being positioned on opposing sides of said second ring with respect to each other, said upper portion of each of said fingers having an upper end; and
a pair of finger mating members, each of said finger mating members having a perimeter edge being continuously arcuate such that each of said finger mating members has a circular shape, said perimeter edge of each of said finger mating members being coupled to said upper end of said upper portion of a respective one of said fingers;
a mating member being attached to said housing such that said mating member releasably engages said vehicle for attaching said housing to said vehicle, said mating member being positioned on said bottom wall of said housing;
a communication unit being integrated into said housing, said communication unit being in remote communication with said personal electronic device, said communication unit being in remote communication with an extrinsic communication network, said communication unit comprising:
a control circuit being integrated into said housing, said control circuit receiving a motion input, said speaker port being electrically coupled to said control circuit, said control circuit being electrically coupled to a power source comprising an electrical system of said vehicle;
a transceiver being integrated into said housing, said transceiver being electrically coupled to said control circuit, said transceiver being in wireless communication with said personal electronic device, said transceiver being in wireless communication with the extrinsic communication network;

a plurality of motion, sensors, each of said motion sensors being integrated into said housing wherein each of said motion sensors is configured to sense motion within a predetermined distance of said vehicle, each of said motions sensors being integrated into a respective one of said front side, said back side, said first lateral side or said second lateral side of said outer wall wherein said plurality of motions sensors is configured to sense motion in 360.0 degrees of said vehicle, each of said motion sensors being electrically coupled to said control circuit, said control circuit receiving said motion input when any of said motion sensors senses motion;

a plurality of cameras, each of said cameras being integrated into said housing wherein each of said cameras is configured to visually monitor the surrounding area of said vehicle, each of said cameras being integrated into a respective one of said front side, said back side, said first lateral side or said second lateral side of said outer wall wherein said plurality of motion sensors is configured to monitor a 360.0 degree area around said vehicle, each of said cameras being electrically coupled to said control circuit, each of said cameras being turned on when said control circuit receives said motion input, said transceiver broadcasting a video signal comprising footage captured by said cameras to a remote data storage unit via the extrinsic communication network when said control circuit receives said motion input;

a microphone being integrated into said housing wherein said microphone is configured to capture audio, said microphone being integrated into said outer wall of said housing, said microphone being actuated when said control circuit receives said motion input, said transceiver placing said microphone in remote communication with said personal electronic device when said control circuit receives said motion input wherein microphone is configured to facilitate a user to hear audio captured by said microphone via said personal electronic device; and a speaker being remotely positioned with respect to said housing wherein said speaker is configured to emit audible sound outwardly from said housing, said speaker being placed in electrical communication with said speaker port in said outer wall of said housing thereby placing said speaker in electrical communication with said control circuit, said speaker being actuated when said control circuit receives said motion input, said transceiver placing said speaker in remote communication with said personal electronic device when said control circuit receives said motion input wherein said speaker is configured to facilitate the user to speak through said speaker.

* * * * *